United States Patent [19]

Arnold

[11] Patent Number: 5,771,396
[45] Date of Patent: Jun. 23, 1998

[54] MERGING SERIAL I/O DATA AND DIGITIZED AUDIO DATA ON A SERIAL COMPUTER BUS

[75] Inventor: Brian K. Arnold, Fort Collins, Colo.

[73] Assignee: Hewlett-Packard Company, Palo Alto, Calif.

[21] Appl. No.: 341,284

[22] Filed: Nov. 16, 1994

Related U.S. Application Data

[63] Continuation of Ser. No. 91,095, Jul. 13, 1993, abandoned.

[51] Int. Cl.⁶ .................................................... G06F 7/32
[52] U.S. Cl. .......................................... 395/840; 395/500
[58] Field of Search .................................. 395/500, 250, 395/860; 379/59, 93, 290; 348/17, 14; 370/110, 118

[56] References Cited

U.S. PATENT DOCUMENTS

| Re. 35,050 | 10/1995 | Gibbs et al. ............................... 379/93 |
|---|---|---|
| 3,928,724 | 12/1975 | Byram et al. ......................... 340/172.5 |
| 4,024,345 | 5/1977 | Kochem .................................... 379/93 |
| 4,131,944 | 12/1978 | Mager et al. ........................... 395/275 |
| 4,330,687 | 5/1982 | Foulkes et al. ......................... 370/125 |
| 4,371,932 | 2/1983 | Dinwiddie, Jr. et al. ............... 395/275 |
| 4,414,432 | 11/1983 | Skerlos et al. .......................... 348/552 |
| 4,468,737 | 8/1984 | Bowen ..................................... 370/56 |
| 4,491,694 | 1/1985 | Harmeyer ............................... 179/100 |
| 4,523,310 | 6/1985 | Brown et al. ........................... 370/112 |
| 4,701,870 | 10/1987 | Mogi et al. ............................. 395/275 |
| 4,748,617 | 5/1988 | Drewlo ................................... 359/121 |
| 4,807,121 | 2/1989 | Halford .................................. 395/275 |
| 4,873,715 | 10/1989 | Shibata ................................... 379/93 |
| 5,007,050 | 4/1991 | Kasparian et al. ....................... 370/77 |
| 5,218,432 | 6/1993 | Wakeland ................................ 358/22 |
| 5,289,465 | 2/1994 | Mouro et al. ............................ 370/82 |
| 5,339,360 | 8/1994 | Endick et al. .......................... 379/386 |
| 5,349,640 | 9/1994 | Dunn et al. ............................ 379/387 |
| 5,386,517 | 1/1995 | Sheth et al. ............................ 395/275 |
| 5,519,833 | 5/1996 | Agranat et al. .................... 395/200.03 |
| 5,524,270 | 6/1996 | Haess et al. ............................ 395/880 |

*Primary Examiner*—William M. Treat
*Assistant Examiner*—Zarni Maung
*Attorney, Agent, or Firm*—Augustus W. Winfield

[57] ABSTRACT

A computer Input/Output (I/O) subsystem providing communication and control between a computer and external audio and telephone devices. The external signals include stereo audio input signals, stereo audio output signals for headphones, monaural audio microphone input signal, monaural audio output signal for a speaker, analog telephone lines and ISDN. Data to and from the multiple computer I/O ports and data to and from the multiple external devices is all merged for communication over a single time-domain-multiplexed full-duplex serial bus. The telephone circuit is designed as an option and is either analog or ISDN. When the telephone circuit is installed, the serial bus is automatically reconfigured to accommodate the additional data and control information. The telephone circuit transparently merges serial telephone data and serial audio data. For example, MODEM data I/O can occur simultaneously with audio sample data.

7 Claims, 7 Drawing Sheets

MERGING SERIAL I/O DATA AND DIGITIZED AUDIO DATA ON A SERIAL COMPUTER BUS

CROSS REFERENCE TO RELATED APPLICATION(S)

This is a continuation of application Ser. No. 08/091,095 filed on Jul. 13, 1993, now abandoned.

FIELD OF INVENTION

This invention relates generally to computer input/output and more specifically to audio and telephone services for a computer.

BACKGROUND OF THE INVENTION

The role of computers is expanding from simple data processing to more generalized information processing and communication. For example, computers are being used to process more abstract information such as audio, images, and video and to control the communication of information such as control of facsimile and telephone services. The need for Input/Output (I/O) is expanding at the same time that more computer functionality is being integrated onto one or a few integrated circuits with increasingly limited connection availability. There is a need for efficient and cost effective data transfer and control between the central processing units and external devices such as analog audio microphones and speakers and analog telephone signals. In addition, there is need to interface to digital telephone systems such as the Integrated Services Digital Network (ISDN), which carries a mixture of voice, computer and video signals. Finally, there is a need to minimize the number of integrated circuit connections required to provide all these services.

SUMMARY OF THE INVENTION

The present invention is a computer Input/Output (I/O) subsystem that provides communication and control between a computer and external audio and telephone devices. As seen by the computer software, audio and telephone I/O is register based, with registers for serial data ports, serial control ports, Direct Memory Access (DMA) ports for ISDN, and DMA ports for digitized audio. The external signals include stereo audio input signals, stereo audio output signals for headphones, monaural audio microphone input signal, monaural audio output signal for a speaker, and analog telephone lines or ISDN. Data to and from the multiple computer I/O ports and data to and from the multiple external devices is all merged for communication over a single time-domain-multiplexed serial bus. Input and output occur simultaneously over the single serial bus (full duplex).

A coder/decoder (CODEC) integrated circuit is used for audio analog-to-digital (A/D) conversion, digital-to-analog (D/A) conversion and various audio control functions. A separate telephone circuit has A/D and D/A conversion for telephone voice and various telephone control functions. The telephone circuit is designed as an option and is either analog or ISDN. When the telephone circuit is installed the serial bus is automatically reconfigured to accommodate the additional data and control information. The telephone circuit transparently merges serial telephone data and serial audio data. For example, MODEM data I/O can occur simultaneously with audio sample data.

DETAILED DESCRIPTION OF THE PREFERRED EMBODIMENT OF THE INVENTION

Figure 1:
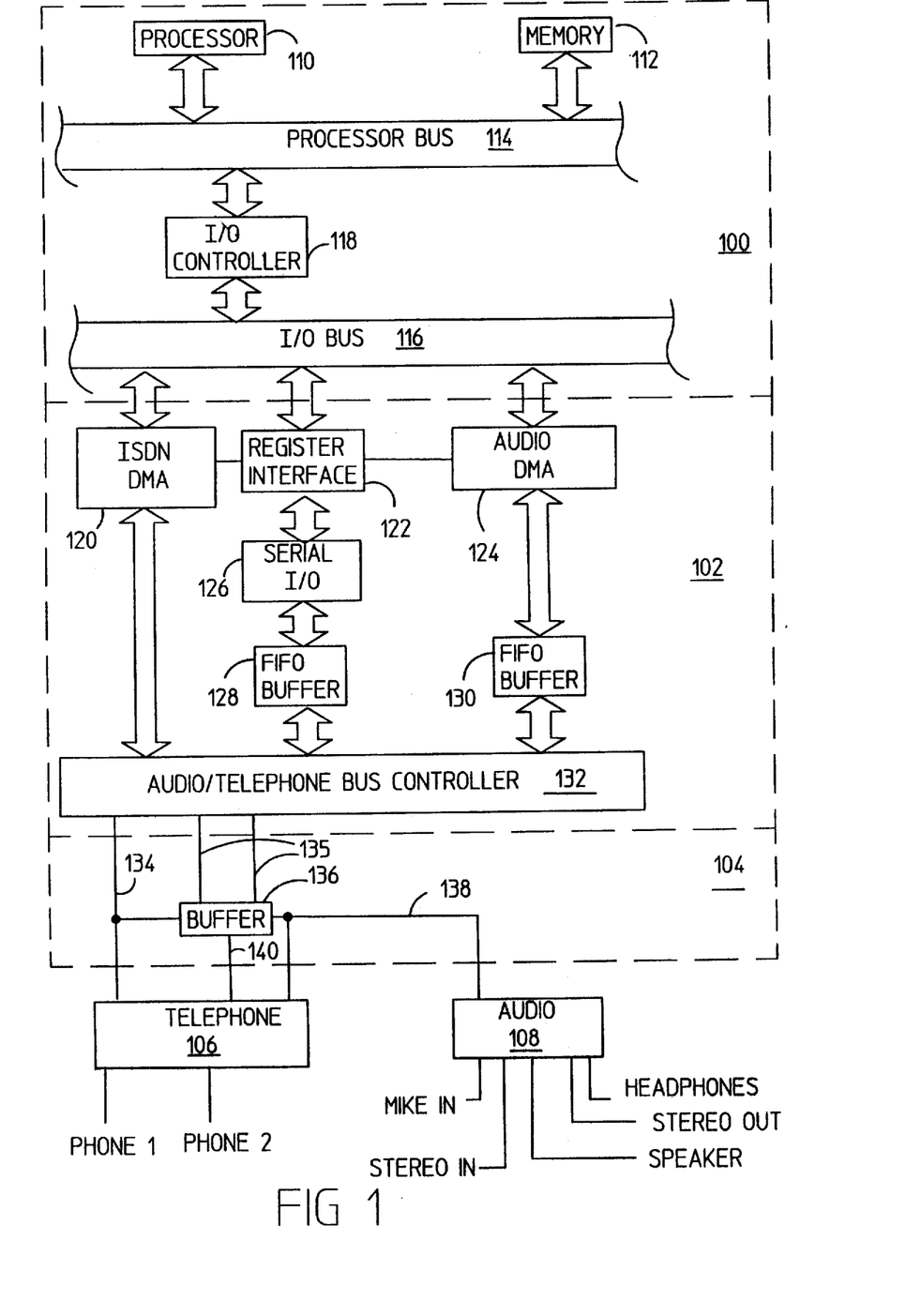
FIG. 1 is a block diagram schematic illustrating a computer system including a serial bus for telephone and audio services.

FIG. 1 is a block diagram schematic illustrating a computer system that includes the present invention. In FIG. 1, a computer 100 has an audio/telephone I/O system 102 connected to a time-domain-multiplexed serial bus system 104 that is connected to a telephone services subsystem 106 and to an audio services subsystem 108. The computer 100 includes one or more processors 110 and random-access-memory (RAM) 112 interconnected by a processor bus 114. A separate I/O bus 116 is isolated from the processor bus 114 by an I/O controller 118. The audio/telephone I/O system 102 includes a bank of registers 122 that provide directly addressable control functions and interrupt driven I/O. In addition there is direct memory access (DMA) for ISDN data (120) and DMA for audio sample data (124). Interrupt driven Serial I/O 126 is used for control and for serial MODEM data. Serial I/O 126 and Audio DMA 124 are both buffered by First-In/First-Out buffers (128 and 130). The ISDN DMA channel 120, Serial I/O 126 and Audio DMA 124 are all merged through an audio/telephone bus controller 132 onto the time-domain-multiplexed serial bus system 104. The telephone system 106 is either a system as illustrated that connects to two analog phone lines or alternatively, a system that connects to a single ISDN line (not illustrated). The audio system 108 provides A/D conversion, D/A conversion and control for external audio devices such as a microphone, headphones, a speaker, and stereo input and output.

Figure 2:
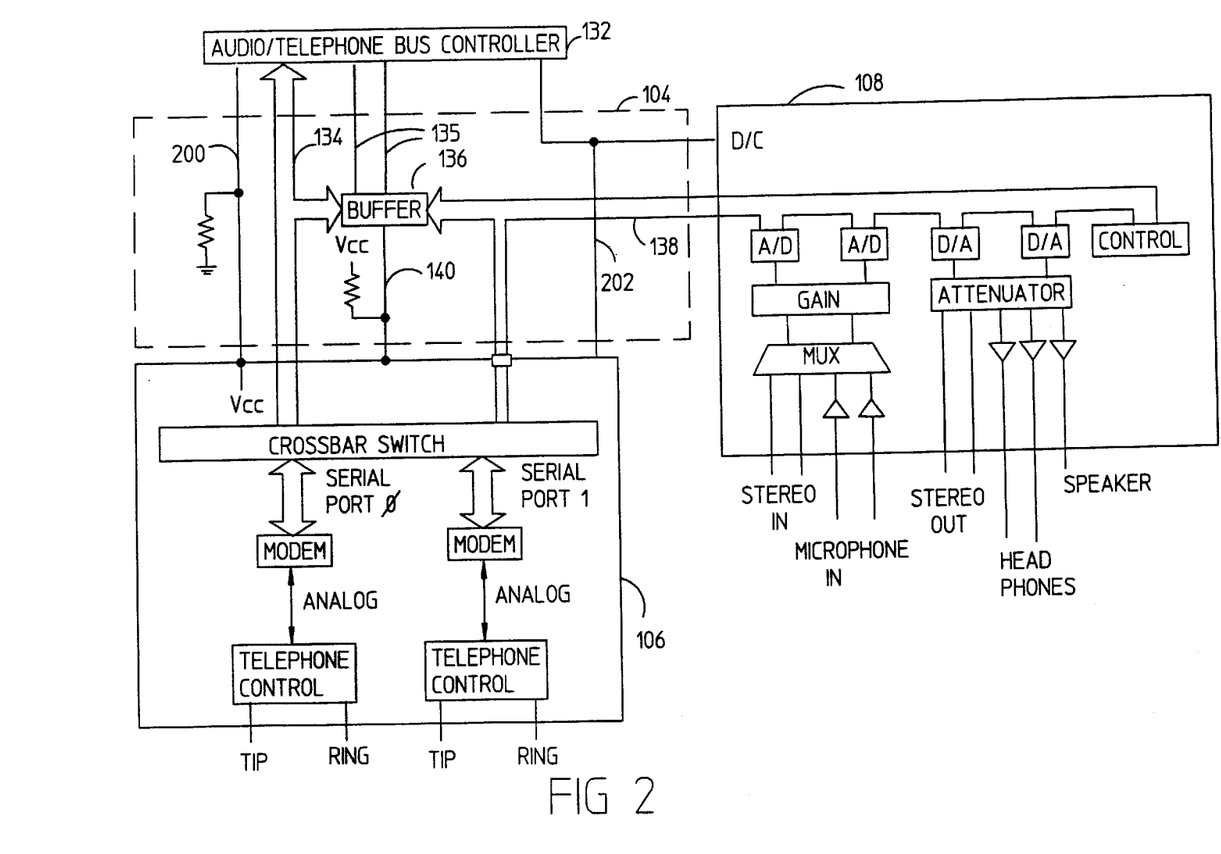
FIG. 2 is a block diagram schematic illustrating additional detail for parts of FIG. 1.

FIG. 2 illustrates additional detail for the bus-system 104, the telephone system 106 and the audio system 108. In one embodiment of the present invention, the audio system 108 is a commercially available CODEC. Example suitable parts are the CS4215 CODEC from Crystal Semiconductor Corporation or the AD1849 CODEC available from Analog Devices. Each CODEC design assumes a serial data bus with 64-bit data frames dedicated to the CODEC. In the present invention, the 64-bit CODEC data frames are time multiplexed with other data over a higher bandwidth serial data bus in a manner that is transparent to the CODEC.

Included in the telephone system 106 is a Digital Signal Processor (DSP) for each channel. An example suitable part is the AD2105 DSP available from Analog Devices. Each DSP is responsible for correctly implementing various MODEM protocols such as V.32 bis. In addition, each DSP has the capability to mathematically combine audio and voice data and return this information to the computer via audio DMA and/or to the CODEC for immediate aural feedback. The bus system 104 is only concerned with the movement of data. That is, the bus system 104 is not concerned with external telephone system protocols or serial data protocols. For example, to the bus system, ISDN is just a digital data port.

Figure 3:
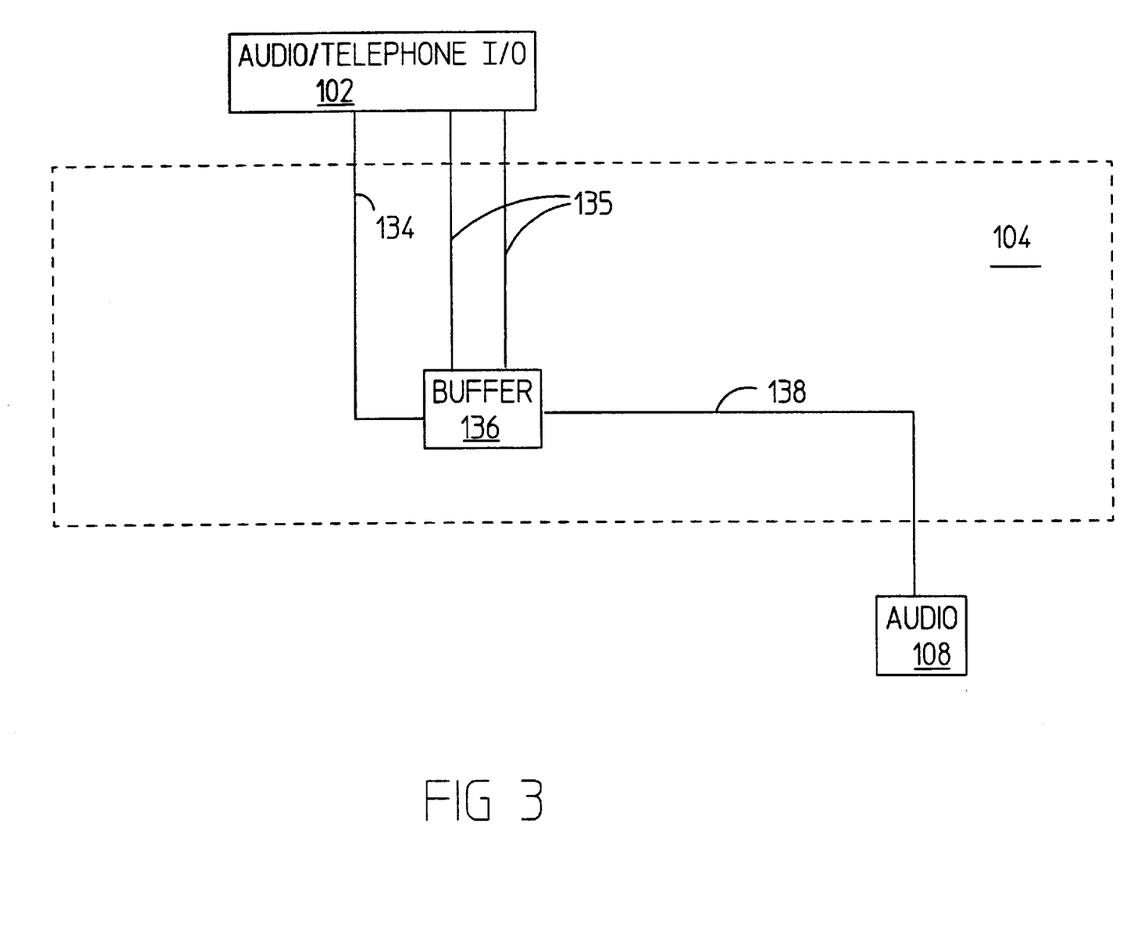
FIG. 3 is a block diagram schematic illustrating the serial bus configuration with audio services only.
Figure 4:
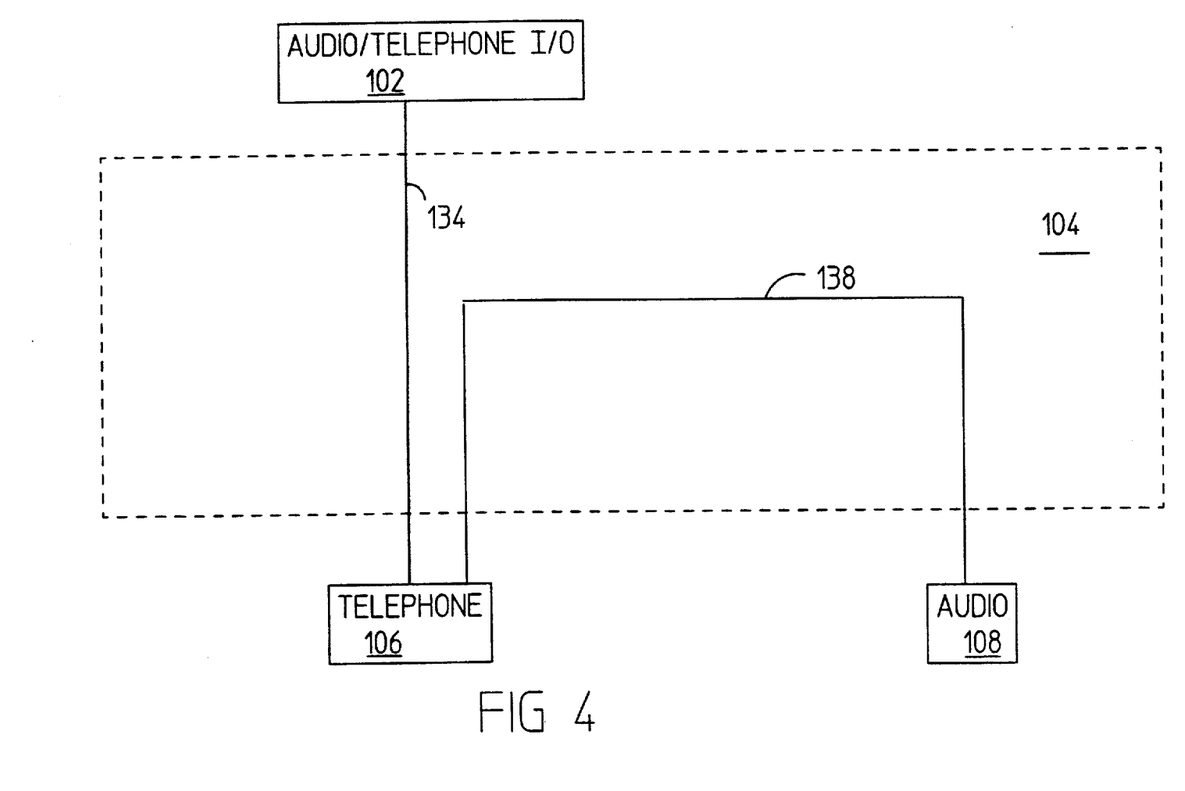
FIG. 4 is a block diagram schematic illustrating the serial bus configuration with both telephone and audio services.

Continuing with FIG. 2, the bus system 104 comprises a merged serial bus 134 (for combined control, telephone and audio data), an audio serial bus 138 (for audio data samples and CODEC control), a buffer 136, a buffer configuration control line 140 and two buffer clock control lines 135. The telephone system 106 is designed to be an optional system. When the telephone system is installed, line 200 is pulled high to signal the audio/telephone bus controller 132 that the telephone system 106 is present. Likewise, buffer configuration control line 140 is pulled low to force the buffer 136 to a normally disabled mode. If the audio system 108 is the only system present, the buffer configuration control line 140 is high so that the bus system 104 is automatically configured as illustrated in FIG. 3. If a telephone system 106 is added, configuration control line 140 disables the buffer 136 so that the bus system 104 is effectively connected as illustrated in FIG. 4. Even if the telephone system 106 is installed, there is a control mode for direct control of the audio system 108 by the computer 100 that temporarily places the bus system 104 in the configuration illustrated in FIG. 3. The control line for this mode is the Data/Control (D/C) line 202. The computer 100 can command the telephone system 106 via D/C line 202 to enable the buffer 136. Therefore, FIG. 3 illustrates the configuration of the bus system 104 for an audio system control mode or for data transfer with no telephone system 106 present. FIG. 4 illustrates the configuration of the bus system 104 for data transfer with a telephone system 106 present.

There are three clocks available for controlling the bus system 104. These clocks are totally asynchronous and are variable. When the audio system 108 is in control mode, the clock rate of the bus system 104 is controlled by the audio/telephone I/O system 102. Otherwise, the clock rate is controlled by the audio system 108 or the telephone system 106 as described below. Two clock control lines 135 control which system controls the clock rate. Either one or none of the clock control lines 135 is active at one time. If either clock control line 135 is active, both the merged serial bus 134 and the audio serial bus 138 are at the same frequency. When one clock control line 135 is active, the common bus system clock rate is controlled by the audio/telephone I/O system 102. When the other clock control line 135 is active, the common bus system clock rate is controlled by the audio system 108. If neither clock control line 135 is active and a telephone system 106 is present, the telephone system 106 controls the clock for the merged serial bus 134, the audio system 108 controls the clock for the audio serial bus 138, and the audio system 108 controls data frame synchronization as described below.

Each of the serial busses (134 and 138) have 5 signals as follows:
1. SDOUT—serial data out
2. SDIN—serial data in
3. SCLK—serial port clock (bit rate)
4. FSYNC—frame sync
5. RESET—reset Data is transferred in frames. As described below, data frames for the audio system 108 on the audio serial bus 138 are always 64 bits/frame. If a telephone system 106 is installed, additional bits are added to each frame on the merged serial bus 134. For either serial bus (134 or 138), the frame sync signal (FSYNC) signifies the beginning of a frame. Time-division-multiplexing is automatically adapted to the system configuration by controlling which systems determine and generate FSYNC and SCLK. As described above, when the audio system 108 is in control mode, SCLK is controlled by the audio/telephone I/O system 102. Otherwise, SCLK is controlled by the audio system 108 or the telephone system 102. The frame sync rate (FSYNC) is determined by the requirements of the audio system 108. If the telephone system 106 is installed, the frame sync signal (FSYNC) for the merged serial bus 134 is generated by the telephone system 106 but the frame sync rate of the merged serial bus 134 is determined by the requirements of the audio system 108. The audio system 108 may generate and receive one sample per frame of either a stereo signal or one sample per frame of a monaural signal. For either stereo or monaural audio data, the FSYNC rate required by the audio system 108 is identical to the audio sample rate.

Figure 5:
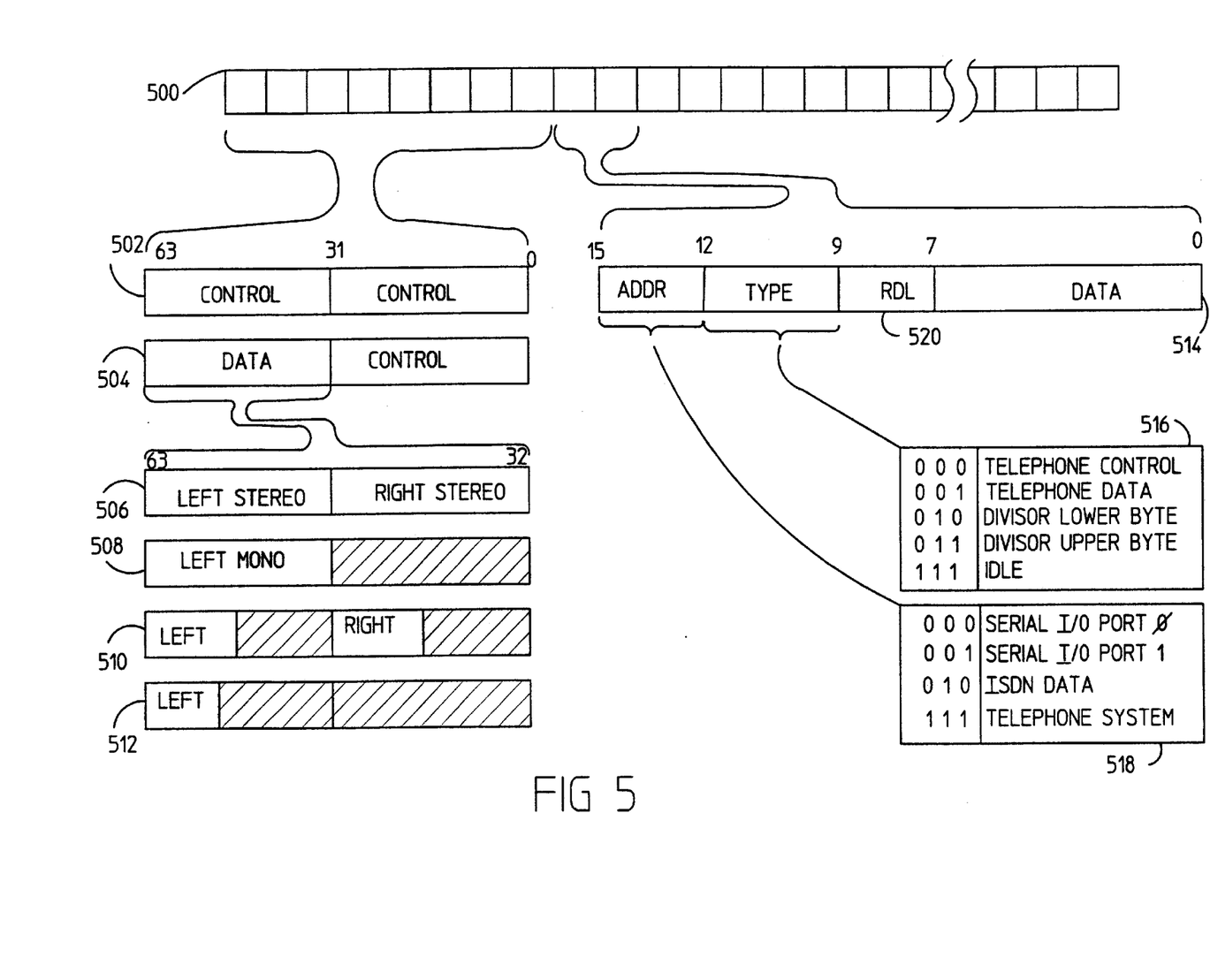
FIG. 5 illustrates data formats for data and control bits within frames.
Figure 6:
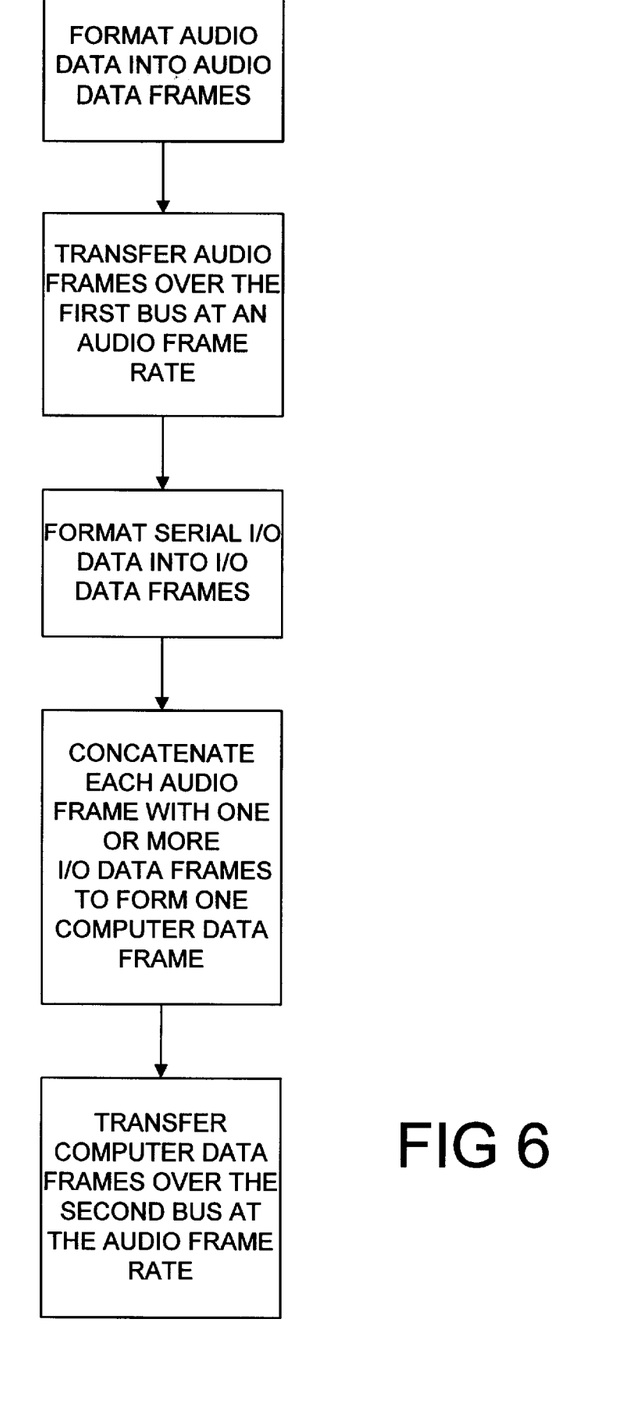
FIG. 6 is a flow chart illustrating the method of merging data onto one bus.
Figure 7:
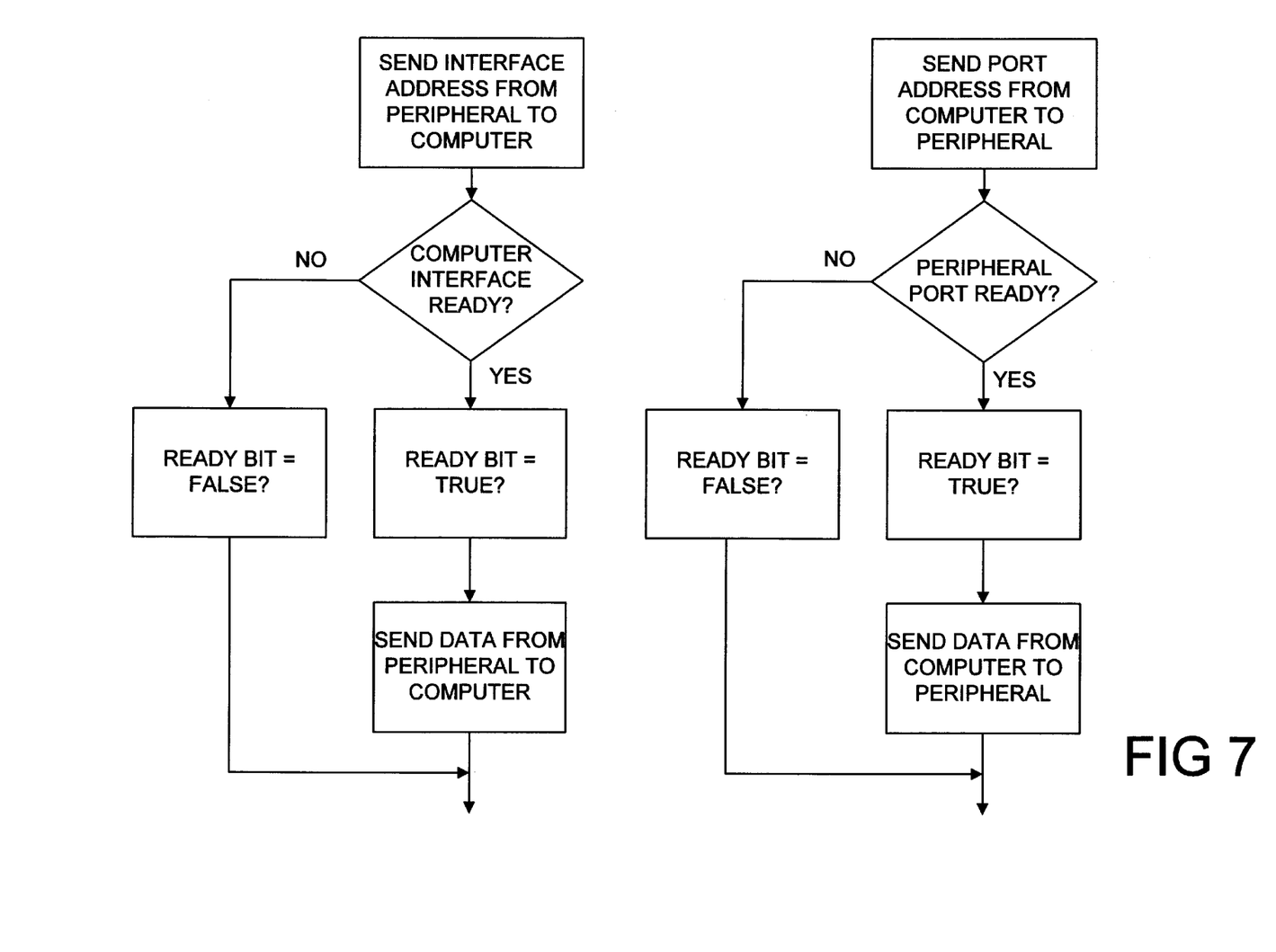
FIG. 7 is a flow chart illustrating the method of simultaneous ready signals on a full-duplex serial bus.

FIG. 5 illustrates the logical format of data frames for the merged serial bus 134. In FIG. 5, a frame 500 is divided into bytes (8-bits). The first 64 bits (FIG. 5, 502) of a frame are dedicated to information to or from the audio DMA port (FIG. 1, 124). The remaining bits are logically divided into smaller 16-bit telephone data frames (Tframes) 514. If the audio system 108 is in a control mode then the first 64 bits are control information as illustrated by FIG. 5, 502. If the audio system 108 is in a data mode then 32 bits are dedicated to data and 32 bits are dedicated to control as illustrated by FIG. 5, 504. The 32 bits of data may comprise 2 16-bit stereo samples (506), one 16-bit monaural sample (508), two 8-bit stereo samples (510) or one 8-bit monaural sample (512). The 32 bits of audio sample data may contain either telephone voice samples (8-bit samples only), audio samples for the audio system 108, or digitally mixed telephone voice samples and audio samples. The remainder of the frame is filled with data for ISDN or serial I/O data as necessary. ISDN or serial I/O may have multiple bytes per frame so that the entire bandwidth of the bus may be used even if some devices are not active.

When the telephone system 106 is installed, the bit rate (SCLK) for the merged serial bus 134 is set by the telephone system 106 to 13.824 Mbits per second. If a telephone system 106 is installed, the number of bits in a frame available for ISDN or serial I/O varies with the sample rate of the audio system 108. The bit rate (SCLK) for the audio serial bus 138 is set by the audio system 108. If there is no telephone system 106 installed, the bit rate (SCLK) and the frame sync (FSYNC) for both serial busses (134 and 138) are generated by the audio system 108. If there is no telephone system installed, the bit rate (SCLK) is 64 times the frame sync (FSYNC) rate.

The following example configurations assume that a telephone system 106 is installed. As a first example configuration for stereo audio, the audio system 108 may be controlled to receive and generate two 16-bit samples per frame (FIG. 5, 506) at a frame rate of 48,000 frames per second. With a bit rate of 13.824 Mbits per second and a frame rate of 48,000 frames per second there are 288 bits per frame. The first 64 bits are dedicated to the two audio samples (and CODEC control) and the remaining 224 bits (28 bytes) are filled with ISDN data or serial I/O data or both. As a second example configuration, the audio system may be controlled to receive or generate one 8-bit sample per frame (FIG. 5, 512) at 5,512.5 frames per second. For the second example, there are 2508 bits per frame. The first 64 bits of the frame are dedicated to the 8-bit audio sample and the remaining 2,444 bits are available for ISDN data and serial I/O data.

Each 16-bit Tframe (514) is divided into 8 bits of data and 8 bits of system information. One three-bit field indicates the destination/source address (ADDR) (518). One three-bit field indicates the type of data contained in the data byte (TYPE) (516). One bit of a two-bit field is used as a ready signal (RDL) (Active low Ready for Data) (520). Recall that the bus is full duplex. As the telephone system 106 is transmitting a frame to the audio/telephone bus controller 132 the telephone system 106 is simultaneously receiving a frame from the audio/telephone bus controller 132. If, for example, the telephone system is transmitting a Tframe 514, with an address 518, at the time of the RDL bit, the audio/telephone bus controller transmits RDL active if the device having the address 518 is ready to receive the corresponding byte of data. Likewise, at the time of the RDL bit, the telephone system 106 transmits RDL active if the addressed serial channel or ISDN port is ready to receive a byte of data.

The order of multiplexed data depends on the direction of data flow. Referring back to FIG. 1, Tframes (FIG. 5, 514) that are sourced by the audio/telephone I/O system 102 are transmitted on a priority basis with the following priority order: (1) telephone control information, (2) ISDN data and (3) telephone data. When information is available for broadcast, an indicator to the audio/telephone bus controller 132 is set by the ISDN DMA port 120, the audio DMA port 124 or the serial I/O port 126. The audio/telephone bus controller 132 arbitrates between the various information sources and serializes the information for transmission to the telephone system 106. Conversely, Tframes that are sourced by the telephone system 106 have no priority order and are simply transmitted as they are received from the DSP(s) in the telephone system 106. Each DSP in the telephone system 106 receives information from the telephone lines and constructs Tframes to be sent to the audio/telephone I/O system 102 as needed.

Each DSP in the telephone system 106 is programmable and is controlled by the computer 100. The telephone system 106 also contains A/D and D/A conversion, under DSP control, for telephone voice signals. These signals are sampled at a fixed rate of 8,000 samples per second with 8-bits per sample. Each DSP also has access to audio data from the audio system 108 (see FIG. 4). Each DSP can be programmed to transmit digitized voice, or audio data, or digitally mixed (added) digitized voice and audio data. Telephone voice samples (or mixed samples) are transmitted/received in the first 64 bits of a frame in the format illustrated in FIG. 5, 510 or 512 (8-bit samples only).

Referring back to FIG. 1, audio samples interface to the computer through a DMA channel 124 and ISDN data interfaces to the computer thorough a DMA channel 120. Each of these channels is bi-directional with simultaneous data transfer in each direction. Memory 112 in the computer is divided into logical pages. To ensure continuous data flow, each DMA channel provides two physical addresses, one for the current data location and one for the beginning address of the next page. Software in the host computer 100 must provide the next page address ahead of time. Each time a page is finished, the DMA channel interrupts the host computer 100 so that software can provide a new page address. There are a total of 4 DMA channels (audio record, audio playback, ISDN record, ISDN playback) so there are 4 current address registers and 4 next page address registers. For ISDN, the DMA circuitry 120 generates an additional interrupt once every Kbyte to decrease the delay time before the computer 100 is aware that new data is present. The ISDN basic rate sends/receives one byte every 125 microseconds. The DMA channel 120 is guaranteed access to processor bus 114 every 20 microseconds. Therefore, the computer 100 and I/O controller 118 can send/receive data at ISDN rates without requiring a buffer.

From the above, it can been seen that the present invention provides a bus for telephone and audio I/O with high performance and flexibility and requires a minimal number of integrated circuit interconnections. The bus system reconfigures automatically if a telephone system is added. Analog or ISDN telephone systems are interchangeable.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A computer system comprising:

a computer;

a first peripheral device;

a second peripheral device;

a first bus that is full-duplex serial, connected to the first peripheral device;

a second bus that is full-duplex serial, connected to the computer, to the second peripheral device and to the first bus;

the first peripheral device transferring first peripheral data over the first bus, the first peripheral data formatted into first data frames having a first frame rate;

the second peripheral device transferring second peripheral data over the second bus, the second peripheral data formatted into second data frames; and the computer transferring computer data over the second bus, the computer data formatted into computer data frames being transferred over the second bus at the first frame rate, each of the computer data frames comprising one of the first data frames concatenated with at least one of the second data frames.

2. A computer system as in claim 1:

the computer data frames comprising one of the first data frames concatenated with more than one of the second data frames, the second data frames thereby being transferred at a rate higher than the first frame rate.

3. A computer system as in claim 2:

the first frame rate being an audio rate.

4. A computer system as in claim 1:

the computer having at least one computer interface;

the second peripheral device having at least one peripheral data port;

each of the second data frames further comprising an address, a plurality of data bits and a ready bit, the address in each of the second data frames from the second peripheral device to the computer designating one of the computer interfaces, the address in each of the second data frames from the computer to the second peripheral device designating one of the peripheral data ports;

wherein when one of the second data frames is being sent from the computer to the second peripheral device, another one of the second data frames is simultaneously being sent from the second peripheral device to the computer; and wherein the ready bit in each of the second data frames from the computer to the second peripheral device indicates whether one of the computer interfaces, designated by the address in the simultaneous data frame from the second peripheral device to the computer, is ready to receive data; and wherein the ready bit in each of the second data frames from the second peripheral device to the computer indicates whether the peripheral data port, designated by the address in the simultaneous data frame from the computer to the second peripheral device, is ready to receive data.

5. A computer system comprising:

a computer;

a first peripheral device;

a second peripheral device that is removable;

a first bus that is full-duplex serial, connected to the first peripheral device;

a second bus that is full-duplex serial, connected to the computer;

wherein the second bus automatically connects the computer directly to the first bus if the second peripheral device is not present;

wherein the second bus automatically connects the computer to the second peripheral device and to the first bus if the second peripheral device is present;

the first peripheral device transferring first peripheral data over the first bus, the first peripheral data formatted into first data frames having a first frame rate;

the computer transferring computer data over the second bus, the computer data formatted into computer data frames being transferred over the second bus at the first frame rate;

the second peripheral device, if present, transferring second peripheral data over the second bus, the second peripheral data formatted into second data frames;

each of the computer data frames comprising one of the first data frames if the second peripheral device is not present; and each of the computer data frames comprising one of the first data frames concatenated with at least one of the second data frames if the second peripheral device is present.

6. A method of merging data on a first bus with data on a second bus, the first bus connected to a first peripheral device, the second bus connected to a computer, to a second peripheral device, and to the first bus through a buffer, the method comprising the following steps:

(a) formatting data for the first peripheral device into first data frames;

(b) transferring the first data frames over the first bus at a first frame rate;

(c) formatting data for the second peripheral device into second data frames;

(d) concatenating, by the buffer, one of the first data frames with at least one of the second data frames to form each one of a plurality of computer data frames; and (e) transferring the computer data frames over the second bus at the first frame rate.

7. A method for indicating a ready condition for communication between a computer and a peripheral device, the computer and the peripheral device connected by a communications bus, the communications bus being full-duplex serial, the method comprising the following steps:

(a) sending a computer address, corresponding to a computer interface, over the communications bus, from the peripheral device to the computer;

(b) sending a peripheral address, corresponding to a peripheral data port, simultaneously with step (a), over the communications bus, from the computer to the peripheral device;

(c) sending a first ready bit, over the communications bus, from the peripheral device to the computer, indicating whether the peripheral device is ready to receive data at the peripheral data port;

(d) sending a second ready bit, simultaneously with step (c), over the communications bus, from the computer to the peripheral device, indicating whether the computer is ready to receive data at the computer interface.

* * * * *

UNITED STATES PATENT AND TRADEMARK OFFICE
CERTIFICATE OF CORRECTION

PATENT NO.   : 5,771,396  
DATED        : June 23, 1998  
INVENTOR(S)  : Brian K. Arnold Page 1 of 1

It is certified that error appears in the above-identified patent and that said Letters Patent is hereby corrected as shown below:

<u>Claim 7,</u>
The last two steps (e) and (f) have been omitted

Signed and Sealed this

Twenty-ninth Day of January, 2002

Attest:

JAMES E. ROGAN  
*Attesting Officer*  *Director of the United States Patent and Trademark Office*